US012657261B2

(12) United States Patent　　(10) Patent No.:　US 12,657,261 B2
Nitsch　　(45) Date of Patent:　Jun. 16, 2026

(54) METHOD AND DEVICE FOR CLASSIFYING SENSOR DATA

(71) Applicant: MicroVision, Inc., Redmond, WA (US)

(72) Inventor: Julia Nitsch, Hamburg (DE)

(73) Assignee: Microvision, Inc., Redmond, WA (US)

( * ) Notice: Subject to any disclaimer, the term of this patent is extended or adjusted under 35 U.S.C. 154(b) by 393 days.

(21) Appl. No.: 18/032,133

(22) PCT Filed: Sep. 9, 2021

(86) PCT No.: PCT/EP2021/074800
　　§ 371 (c)(1),
　　(2) Date: Apr. 14, 2023

(87) PCT Pub. No.: WO2022/078676
　　PCT Pub. Date: Apr. 21, 2022

(65) Prior Publication Data
　　US 2025/0278458 A1　　Sep. 4, 2025

(30) Foreign Application Priority Data
　　Oct. 14, 2020　(EP) ..................................... 20201774

(51) Int. Cl.
　　*G06F 18/2415*　　(2023.01)
　　*G06N 3/094*　　(2023.01)
(52) U.S. Cl.
　　CPC ......... *G06F 18/2415* (2023.01); *G06N 3/094* (2023.01)
(58) Field of Classification Search
　　CPC ............. G06F 18/2415; G06F 18/2163; G06F 18/213; G06F 18/2113; G06F 16/5846;
　　　　　　(Continued)

(56) References Cited

U.S. PATENT DOCUMENTS

2013/0117780 A1* 5/2013 Sukthankar ......... G06F 16/7867
　　　　　　　　　　725/32
2017/0193399 A1* 7/2017 Wang ...................... G06N 5/04
　　　　　　　(Continued)

FOREIGN PATENT DOCUMENTS

EP　　　　3300002 A1 *　3/2018 ........... G06V 10/454
WO　WO2019146422　　8/2019
WO　WO2020049667　12/2020

OTHER PUBLICATIONS

Wallingford et al: Article "In the Wild: From ML Models to Pragmatic ML Systems", arxn.org, Cornell University Library, NY 14853, Jul. 6, 2020 (Jul. 6, 2020), XP081716570 (Year: 2020).*
　　　　　　　(Continued)

*Primary Examiner* — Evan Aspinwall
(74) *Attorney, Agent, or Firm* — Kevin D. Wills

(57)　　　　ABSTRACT

A method and a device for classifying sensor data are proposed, wherein the method comprises providing a respective averaged feature vector for a multiplicity of classes wherein the method further comprises the following steps by means of a classifier, wherein the classifier comprises at least one neural network trained on the basis of training data:
　　determining a feature vector on the basis of sensor data,
　　respective determining of a cosine similarity between the feature vector and a respective averaged feature vector for the multiplicity of classes,
　　comparing the respective cosine similarity with a threshold value established for each class beforehand,
　　detecting a scenario not represented by the multiplicity of classes if the threshold values are not reached for all classes, and wherein
　　the device comprises a classifier and is designed for carrying out the method.

16 Claims, 3 Drawing Sheets

(58) Field of Classification Search
  CPC .......... G06F 16/38; G06F 16/55; G06F 16/56;
       G06F 18/24147; G06F 16/906; G06F
       18/2155; G06F 18/241; G06F 18/253;
       G06F 18/2431; G06N 3/094; G06N 3/02
  USPC .......................................................... 707/737
  See application file for complete search history.

(56) References Cited

U.S. PATENT DOCUMENTS

| | | | | |
|---|---|---|---|---|
| 2018/0341836 | A1* | 11/2018 | Lim | .................... G06F 18/2413 |
| 2019/0303711 | A1* | 10/2019 | Kalivas | .................. H04N 23/23 |
| 2019/0311301 | A1* | 10/2019 | Pyati | ..................... G06F 16/901 |
| 2019/0370614 | A1* | 12/2019 | Crouch | .................. G06V 20/56 |
| 2021/0073517 | A1* | 3/2021 | Ahmad | ................ G06V 10/454 |
| 2021/0089964 | A1* | 3/2021 | Zhang | .................. G06V 10/776 |
| 2022/0277579 | A1* | 9/2022 | Svoboda | ................. G06F 21/32 |
| 2023/0146134 | A1* | 5/2023 | Selviah | ................ G06V 20/653 |
| | | | | 345/419 |
| 2023/0229897 | A1* | 7/2023 | Komkov | .............. G06N 3/0464 |
| | | | | 382/155 |

OTHER PUBLICATIONS

Matthew Wallingford et al: "In the Wild: From ML Models to Pragmatic ML Systems", arxiv.org, Cornell University Library, NY 14853, Jul. 6, 2020 (Jul. 6, 2020), pp. 4-6 and 15, XP081716570.

Xingyu Chen et al: "A Boundary Based Out-of-Distribution Classifier for Generalized Zero-Shot Learning", arxiv.org, Cornell University Library, NY 14853, Aug. 9, 2020, (Aug. 9, 2020), pp. 5-11, XP081738420.

Kimin Lee et al: "A Simple Unified Framework for Detecting Out-of-Distribution Samples and Adversarial Attacks", arxiv.org, Cornell University Library, NY 14853, Jul. 11, 2018 (Jul. 11, 2018), pp. 1-7, XP081415333.

Rousseeuw Peter J et al: "Robust Distances: Simulations and Cutoff Values", Directions in Robust Statistics and Diagnostics, Part II, Bd. 34, 1991, pp. 195-203, XP055787412, DOI: 10.1007/978-1-4612-4444-8_11.

Kimin Lee et al: "Training Confidence-calibrated Classifiers for Detecting Out-of-Distribution Samples", arxiv.org, Cornell University Library, University Ithaca, NY 14853, Nov. 26, 2017 (Nov. 26, 2017), All Pages, XP081319903.

Engkarat Techapanurak et al: "Hyperparameter-Free Out-of-Distribution Detection Using Softmax of Scaled Cosine Similarity", arxiv.org, Cornell University Library, 201 Olin Library Cornell University Ithaca, NY 14853, May 25, 2019 (May 25, 2019), All Pages, XP081535684.

International Search Report, mailed on Nov. 26, 2021, issued for the relevant International Patent Application No. PCT/EP2021/074800.

* cited by examiner

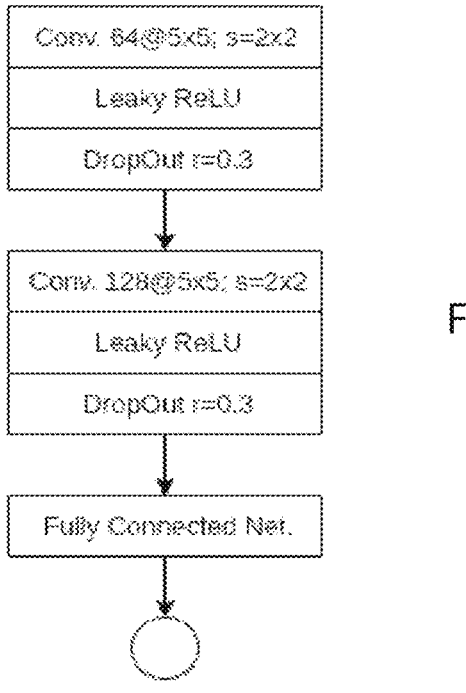
Fig. 4
Fig. 5
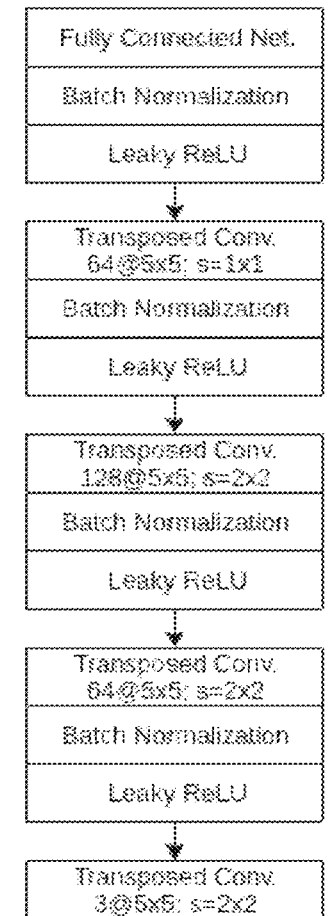

METHOD AND DEVICE FOR CLASSIFYING SENSOR DATA

CROSS REFERENCE TO RELATED APPLICATIONS

The present application is a U.S. National Phase of International Patent Application Serial No. PCT/EP2021/074800, filed on Sep. 9, 2021 which claims priority to European Patent Application No.: EP 20201774.5, filed on Oct. 14, 2020, the contents of each of which are incorporated by reference in their entirety for all purposes.

The present invention relates to a method and a device for classifying sensor data according to the independent claims.

PRIOR ART

In particular in the driverless navigation of vehicles, a classification of objects detected by means of sensors, such as for example road users, is essential, in order to be able to navigate on the basis thereof.

From the prior art, it is known that at least one previously defined class is assigned to a detected object. However, it is equally crucial that it is detected when an object does not fall within the predetermined classes. Only then can it be guaranteed that a decision with regard to the controlling of the vehicle is not based on false assumptions.

This problem is all the more important when neural networks are used for the classification. With regard to neural networks, it is known that these only function well for the evaluation of data which were presented to the neural network during the training at least in a similar manner, i.e. when these data follow the distribution of the training data.

Presentation of the Invention: Problem, Solution, Advantages

It is therefore an object of the invention to provide a method for classifying sensor data such that it can be reliably estimated whether an unknown scenario is present, which is unfamiliar to a neural network used for the classification.

The above-mentioned object is solved by a method for classifying sensor data, which comprises providing a respective averaged feature vector for a multiplicity of classes. For each class, its own averaged feature vector is thus provided.

The method uses a classifier, wherein the classifier is a neural network trained on the basis of training data. The multiplicity of classes is in particular a finalized and predefined number of classes, on the basis of which the neural network was previously trained. The averaged feature vector is in other words an average vector which is determined for each previously defined class.

The method here comprises a determining of a feature vector on the basis of sensor data by means of the classifier.

The method further comprises a respective determining of a cosine similarity, by means of the classifier, between previously determined feature vector and a respective averaged feature vector for the multiplicity of classes, comparing the respective cosine similarity with a threshold value determined for each class beforehand, and identifying a scenario not represented by the multiplicity of classes if the threshold values for all classes are not reached. The method is thus configured to detect anomalies in the classification of sensor data.

The cosine similarity constitutes in particular a numerical value which states how similar vectors are, wherein the number lies between +1 and −1. When the cosine similarity is, for example, +1 for a class, the corresponding feature vector corresponds exactly to the averaged feature vector of the corresponding class.

The neural network was trained beforehand on the basis of training data. These training data comprise the multiplicity of classes. In particular, each class represents an object category, for example a pedestrian or a bicycle. In particular, the training data for each class comprise a multiplicity of training samples, wherein the training samples constitute the object, represented by the class, in as many and different scenarios as possible. Each training sample thus comprises an object in an environmental condition. The training samples preferably concern image data or lidar data, in particular point clouds. Of course, not all possible scenarios can be covered there.

A scenario is preferably defined by the comprised object and the environmental conditions, for example the weather condition. A scenario can constitute, especially, an object in combination in a weather condition, such as for example snow, rain, fog, dust, hail, in particular as a function of the intensity of the weather condition, for example the density of the fog. A pedestrian in normal visibility (for example with a cloudy sky) constitutes a different scenario to a pedestrian in a hailstorm. Both, however, fall within the "pedestrian" class, wherein the scenario "pedestrian in hailstorm" possibly was not included in the training data because this occurs extremely rarely. A method for object detection is to detect an object in as far as possible all possible environmental conditions, however is also to know its limits, in the sense that the method detects when it can not detect an object on the basis of the present scenario with sufficient confidence, as it was not represented in the training data.

A scenario which is not represented in the training data, in other words an unknown or unfamiliar scenario, can thus constitute a hitherto not detected, i.e. new, object category and/or a hitherto not included, i.e. new, environmental condition, in particular weather condition, of an object category included in the training data. When the threshold value of at least one class is exceeded, the method can comprise the assigning of the corresponding class and preferably a confidence. In particular, the cosine similarity can be assigned as confidence.

In the case of not reaching the threshold values of cosine similarity for all classes, the method is able to detect that a scenario is present which was not covered by the multiplicity of classes. The neural network is thus able to detect a deviation of the results which are to be expected, which are based on the training thereof. In other words, it is made possible that a decision is made as to whether the classification was valid or not, which can have a considerable effect on the further processing of the information for the driverless navigation of vehicles.

The method can thus be configured to detect a scenario of a particular class in the sensor data, however in the case of not reaching all threshold values, to detect that the scenario is not sufficiently represented in the training data. Furthermore, special cases can also be present, for example a pothole or an accident site with vehicle parts on the roadway, wherein the method does not recognize these as represented by the training data, as they constitute an actual new class, in other words object category. Also for example a scenario with a new object (for example a new road user), which was not included in the training data, is also a scenario not represented in the training data, as the entire class is not represented. An example would be a cargo bike, which indeed resembles a bicycle, but nevertheless constitutes a class of its own. In all the above-mentioned cases, it is established that the detected scenario is not represented in the training data. In the case of a scenario which is not represented by the multiplicity of classes, the concern is therefore with an out-of-distribution sample or respectively an out-of-distribution detection.

The method therefore differs from methods known from the prior art, which assign a classification to each scenario on the basis of similarity with the classes. The present method can thus also be used in safety-critical applications, such as preferably the driverless navigating of a vehicle, as the classifier is configured to detect unknown scenarios as such in a safety-critical manner. This thus enables not only an error prevention during the application, but also the detection of new scenarios, so that these can be included increasingly into the training data and thus a covering of all occurring scenarios can be guaranteed.

Furthermore, the method can comprise an determining of a Mahalanobis distance between a covariance matrix, the averaged feature vector and the determined feature vector on the basis of the sensor data for each class. This serves in particular to better detect scenarios not taken into consideration by the multiplicity of classes, as the cosine similarity does not take into consideration the distribution of the features, but only the averaged values thereof. For this reason, the Mahalanobis distance can be used in addition.

As the Mahalanobis distance is not "bounded", i.e. not limited, which is necessary in order to estimate this with respect to confidences, a reference value, in particular the function value of the cumulative density function, based on a $\chi^2$-distribution, is determined. This functions, as is known that the Mahalanobis distance follows the $\chi^2$-distribution, when the number of degrees of freedom corresponds to the dimension of the features. The reference value for each class is determined by the function value of the $\chi^2$-distribution being determined at the place of the respective Mahalanobis distance. In other words, the Mahalanobis distance of the class is the X-value, which is inserted into the $\chi^2$-distribution. The corresponding Y-value is subtracted from a one in order to obtain the reference value for the class. A comparison can take place again of the respective reference values with a previously established threshold value for each class. On falling below the threshold values for all classes, a scenario is detected which is not represented by the multiplicity of classes. This double control by means of cosine similarity and the Mahalanobis distance serves for a particularly high safeguard that scenarios which are not taken into consideration in the multiplicity of classes, are also detected.

In particular on falling below the threshold values for all classes, the method can label, on other words characterize, the detected scenario as unknown compared to the training data.

Furthermore, a previously defined minimum confidence can be assigned to the detected scenario. In particular, a minimum confidence can be assigned to each class. In particular, the minimum previous defined confidence lies distinctly under the corresponding cosine similarity for each class. This minimum confidence can correspond to zero, for example.

The method can comprise a storing of sensor data, in which the not represented scenario was detected, as supplement to the training data. In this way, the training data which were used for the training of the neural network can be supplemented. Thus, sensor data can be stored to new scenarios in an automated manner. Thereby, the laborious manual sifting of scenarios in the "entering" of training data, which is not only time-consuming and thus expensive, but also prone to error, is replaced. In the data recording for training data, hours of sensor data must be recorded and evaluated or respectively labelled manually, in order to guarantee the security of a method for classification. Here, of course, "regular" scenarios are recorded more frequently than, for example, scenarios with very rare weather phenomena or with rare road users. The present method makes it possible to store such sensor data of scenarios not included in the training data and preferably, in a next step, for example in a subsequent "update" of the classifier, to use them in order to also train the latter with regard to the new scenarios. Previously, a manual labelling of the stored sensor data can take place, in order to assign a new class on the basis of the scenario which is unknown to the training data.

The sensor data can concern, in particular, lidar data. In other words, the sensor data concern in particular a point cloud. The method can comprise, in particular, the receiving of the sensor data by means of a corresponding sensor, in particular a lidar sensor, preferably a solid state lidar sensor. Furthermore, the sensor data can concern radar data or image data. The method here can comprise a pre-processing of the sensor data. In particular, a unit for pre-processing can detect in a point cloud points which clearly take place from the reflection on a shared object. These cohesive points, in other words clusters, can be passed on to the classifier as pre-processed sensor data.

The neural network of the classifier can be divided in particular functionally into a first unit and a second unit. Here, the first unit and the second unit comprise different layers of the neural network, wherein the differentiation according to first unit and second unit takes place with regard to their function. The first unit is configured as a feature extractor for the extraction of features from the sensor data. The second unit is configured as a classification unit. The first unit serves for the preparation of the sensor data for the second unit.

In particular, the feature extractor comprises a "multi layer perceptron" (MLP-) network, which comprises at least one "multi layer perceptron" as a layer (MLP layer). Each layer contains a multiplicity of artificial neurons. In particular, the MLP network comprises a multiplicity of MLP layers. The MLP layers are preferably all activated respectively by a non-linear function, in particular a so-called ReLU function. A ReLU function is a function which as Y value assigns zero to a negative x-value, while it otherwise represents a linear function with slope 1. The MLP preferably has at least 3, in particular at least 5, layers, which can comprise several sub-layers.

Furthermore, the MLP network can comprise at least one fully connected layer, which can also be activated by a non-linear function, in particular a so-called ReLU function.

The MLP network is able to process input in the form of point clouds. Output of the network are therefore features, in particular in the form of vectors. Here, the last layer in particular has no activation. Finally, a softmax normalization can take place. As a result—before the softmax normalization, preferably a bottleneck vector is obtained. The bottleneck vector is thus the result of the last layer of the neural network before a possible softmax normalization, and constitutes a feature vector.

Alternatively, the feature extractor can also be a CNN (convolutional neural network). For this, the point cloud which is present as sensor data must, however, be previously transformed into an image representation. The CNN comprises in particular a multiplicity of layers. In particular, the CNN comprises alternately a convolutional layer and pooling layer. The CNN is configured to extract lines, L features and/or circle features. A feature can also be designated as "feature".

The second unit of the classifier comprises at least one, preferably two or three, fully connected layers, which directly adjoin the last layer of the first unit. Preferably, the second unit consists of the at least one fully connected layer. Each layer comprises a multiplicity of artificial neurons. The second unit serves for the processing of the feature vectors of the first unit.

In particular, the method comprises a training of the classifier, and namely of the neural network of the classifier, by means of the training data, wherein the training data comprise first training samples and second training samples. Here, the second training samples are produced by means of a generative adversarial network (GAN), having a generator and a discriminator, whereas the first training samples are based on a reception of scenarios by means of a sensor. The first training data thus constitute the typical training data, which are entered by means of corresponding sensors, i.e. were received in actual situations. The first training samples thus comprise an in particularly manually assigned label.

The classifier is carried out in particular on the basis of a cross entropy loss on the basis of the first training samples added with a Kullback-Leibler (KL) divergence on the basis of the second training samples. The KL divergence calculates the difference between two distributions and by addition of the divergence to a loss it is achieved that the distributions equalize accordingly. For this, the KL divergence is added to the loss in an additive manner. The aim is that the classifier detects objects from the second training samples with an equally distributed probability for all classes, so that in the case of application the cosine similarity thereof with all averaged feature vectors of the first training samples lies below the corresponding threshold values. The training takes place on the basis of the manual labels of the first training samples and the labels produced by means of the classifier by a corresponding comparison by means of the cross entropy loss and the additively added KL divergence and an adapting of the weights of the neural network of the classifier. As in the training the averaged feature vectors are not present, in the training work is carried out on the basis of uncertainties which the softmax normalization outputs. The aim in the training is that the uncertainties in second training samples are distributed equally to all classes, so that then in the case of application, i.e. after completed training, in a scenario which is not represented in the training data, the cosine similarities lie under the threshold values and are thus identified as such.

The generator and also the discriminator of the GAN can concern artificial neural networks. Here, the generator generates so-called candidates, second training samples here, which the discriminator evaluates. The aim of the generator is to learn to generate results according to a particular distribution. The discriminator on the other hand is trained to differentiate the results of the generator from the data of the genuine, predetermined distribution. The target function of the generator consists in generating results which the discriminator can not differentiate. In this way, second training samples are produced, which lie at the decision boundaries of the classifier. The classifier evaluates the results with an evenly distributed probability. Therefore, the KL divergence is also added to the generator loss in an additive manner.

The method comprises in particular a training of the GAN, especially of the generator and of the discriminator, wherein the training of the classifier and of the GAN takes place jointly. Furthermore, the training of the feature extractor can also take place jointly.

The training of the generator is carried out on the basis of a binary cross entropy loss on the basis of the second training samples, added with a KL divergence on the basis of the second training samples. The second training samples are evaluated by means of the discriminator. Here, the discriminator evaluates originally first training samples for example with a one, whereas second training samples are evaluated differently, for example with a zero. The binary cross entropy loss refers to the evaluation of the second training samples by the discriminator. The KL divergence is based on a classification of the second training samples by the classifier compared to an evenly distributed probability. The weights of the generator in the training are adapted so that it generates second training samples which the discriminator evaluates just as first training samples, however the classifier assigns an evenly distributed probability to all classes in a distributed manner.

The discriminator is also trained on the basis of a cross entropy loss, in particular binary cross entropy loss, and namely on the basis of the first training samples and the second training samples generated by the generator. The joint training of the classifier and of the GAN serves for the generator not only to attempt to deceive the discriminator, but also to produce unknown scenarios for the classifier, which this evaluates with an evenly distributed probability. Thereby, the reliability of the detecting of unknown scenarios is substantially increased. Here also, during training in particular the weights of the neural networks are adapted.

The discriminator can have in particular at least one, preferably two, convolutional layers, and are activated by a ReLu function, especially a leaky Relu function. A leaky ReLu function is a function which assigns to an x-value as Y value a small value greater than zero (e.g. $0.01\times$), whereas it otherwise constitutes a linear function with slope 1. Lastly, preferably a fully connected layer with a single output neuron is used. In particular, the discriminator is configured as shown in FIG. 4.

The generator can consist of a fully connected layer with a batch normalization and an activation by means of a "leaky ReLU". Subsequently, three transposed convolutional blocks can follow. In particular, respectively with $5\times5$ kernel and with a batch normalization and a leaky ReLU activation. The last layer can follow from a transposed convolutional layer, preferably again with $5\times5$ kernel.

In particular, the generator is configured as shown in FIG. 5.

The training can take place in particular as follows:

Firstly, the loss of the discriminator, namely the cross entropy loss, is generated, in order to differentiate first training data and second training data which originate from the generator. The discriminator loss is thus defined as the sum of the binary cross entropy loss of the first training samples and of the generated second training samples. Da stands here for a first training sample. "noise" is a 100 dimensional random vector generated from a standard Gaussian distribution (mean=0, stddev=1). This random vector is input for the generator.

$$Loss_d = BCE(disc(D_{in}), \underline{1}) + BCE(disc(gen(noise)), \underline{0})$$

The generator is not only trained to deceive the discriminator, but also to generate second training samples, and namely at the decision boundaries of the classifier. The loss of the generator is thus defined as:

$$\text{Loss}_g = BCE(disc(gen(\text{noise})), \underline{1}) + KL\left[cls(gen(\text{noise}))\left\|\frac{1}{|c|}\right],\right.$$

wherein KL stands for the KL divergence, $|c|$ represents the number of the classes or respectively the quantity of the classes and $1/|c|$ represents the uniformly distributed probability over the classes. In the manner described above, the corresponding weights of the neural networks are adapted in order to deceive the discriminator that the second training samples follow the distribution of the first training samples and furthermore to achieve an equal distribution of the probabilities of the classifier to second training samples. This is important, because it is then ensured that an unknown scenario falls under all threshold values of the multiplicity of classes.

The loss of the classifier is defined as:

$$\text{Loss}_{cls} = CE(cls(D_{in}), \text{labels})) + KL\left[cls(gen(\text{noise}))\left\|\frac{1}{|c|}\right].\right.$$

All weights are initialized with the Xavier uniform initializer.

Advantageously, an averaged feature vector is determined for each class, wherein the training data comprises a number of first training samples per class and wherein the averaged feature vector of a class is determined by the following steps:

Firstly, in particular by means of the classifier (before the softmax normalization) a feature vector is determined for each first training sample of a class. This concerns here in particular the bottleneck vector. These feature vectors are added to obtain an added feature vector. The latter is divided by the number of the first training samples of the corresponding class. As a result, the averaged feature vector of a class is obtained. The averaged feature vector concerns in particular the averaged bottleneck vector of the corresponding class. The averaged feature vectors are determined in particular after a training of the classifier.

For each class in particular the threshold value is determined, wherein the threshold value of a class is determined by the following steps: Firstly the cosine similarity of the feature vectors of each first training sample is determined with the averaged feature vector of the class. The determined cosine similarities are now either averaged and thus an averaged cosine similarity is calculated, or the smallest cosine similarity is determined from the quantity of cosine similarities of the first training data of the class. The threshold value can be established either as the averaged cosine similarity or the smallest cosine similarity.

For example, the threshold can have been established at 0.85. If a cosine similarity between a determined feature vector and the averaged feature vector of 0.92 is now determined, the corresponding class can be issued with a high confidence and thus a valid detection can be confirmed.

In particular, the present method for classifying sensor data is part of a method for the driverless navigation of a vehicle.

In a further aspect, the invention comprises a device for classifying sensor data, wherein the device comprises a classifier and is configured to perform a method described above. In particular, the classifier is trained as described above. In addition, the device can comprise a GAN described above, which in particular is trained as described above. The classifier can comprise in particular a decision module, which on the basis of the threshold values and the determined cosine similarities and preferably Mahalanobis distances assigns a class and/or a confidence and/or a label as unknown. In particular, the device serves for the navigation of a driverless vehicle.

The invention further comprises a computer program product which comprises a computer-readable storage medium on which a program is stored, which enables a computer, after it has been loaded into the memory of the computer, to carry out a method, described above, for classifying sensor data in cooperation with a device, described above.

In addition, the invention relates to a computer-readable storage medium on which a program is stored, which enables a computer, after it has been loaded into the memory of the computer, to perform a method, described above, for classifying sensor data in cooperation with a device, described above.

BRIEF DESCRIPTION OF THE FIGURES

There are shown in purely schematic representation

FIG. 4: a configuration of a discriminator, and

FIG. 5 a configuration of a generator.

PREFERRED EMBODIMENTS OF THE INVENTION

Figure 1:
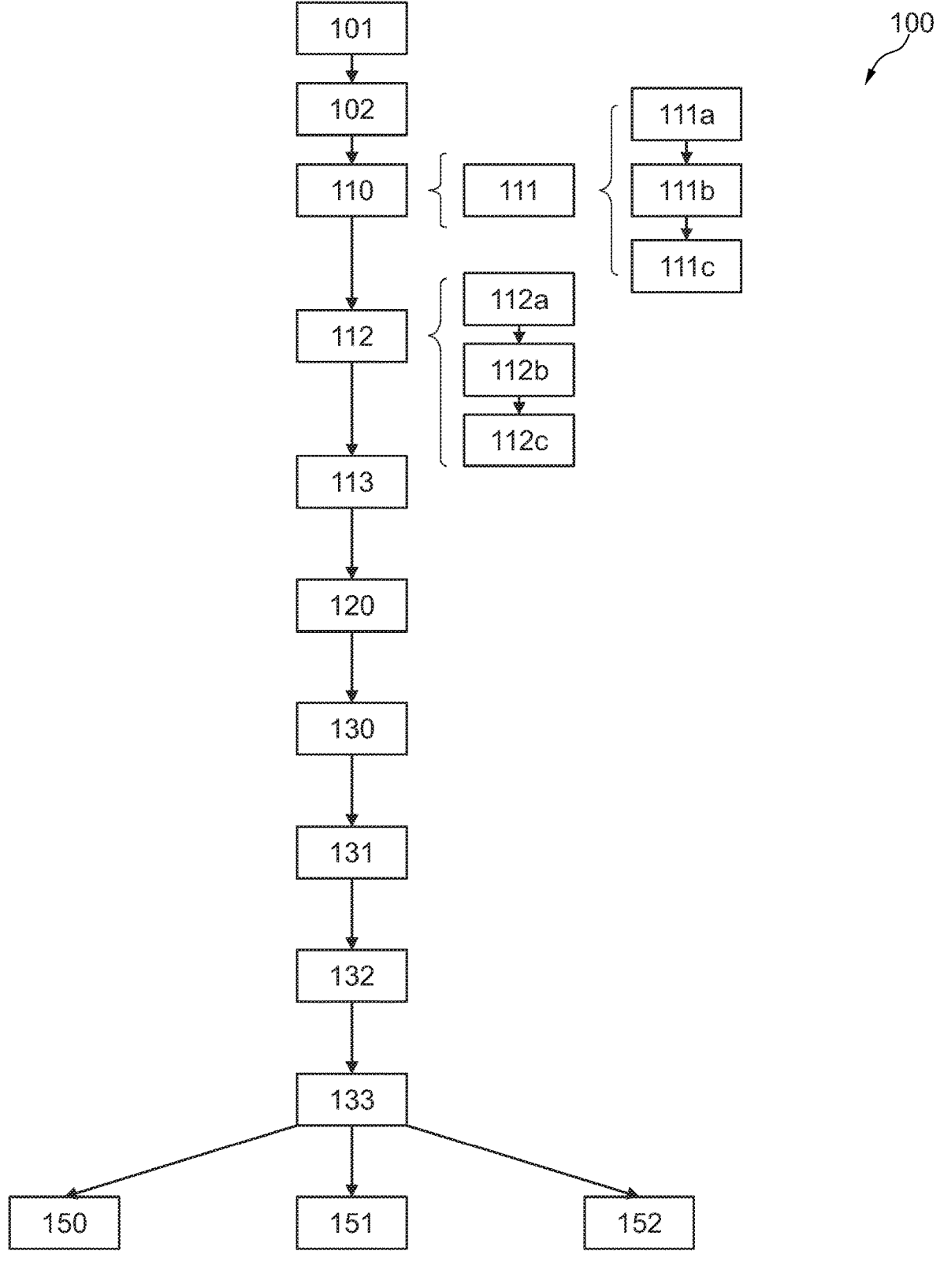
FIG. 1 a method diagram of a method according to the invention.

FIG. 1 shows a method diagram of a method 100 according to the invention for classifying objects. The method 100 comprises providing 110 a respective averaged feature vector 30 for a multiplicity of classes. By means of a classifier 10 a feature vector is determined on the basis of sensor data 120. A cosine similarity between the determined feature vector and the respective averaged feature vectors is determined for all classes 130 and the cosine similarities are compared to a previously determined threshold value 131. On falling below the threshold values for all classes, a scenario not represented by the multiplicity of the classes is detected 133.

The method 100 can comprise in particular the training 101 of the classifier 10 and the training 102 of the GAN 20. This takes place in particular jointly.

Furthermore, the respective averaged feature vectors 30 can be determined for the multiplicity of classes 111. For this, in particular a feature vector is determined for each first training sample of a respective class 111a, the corresponding feature vectors of all first training samples for the respective class are added 111b and divided by the number of the first training samples of the class 111c.

Furthermore, the respective threshold value can be determined for the multiplicity of classes 112. This takes place in particular by determining 112a the cosine similarities of the feature vector of each training sample with the averaged feature vector 30 of the class. The averaged cosine similarity or the smallest cosine similarity is determined 112b. The averaged cosine similarity is calculated in particular by adding the cosine similarities of all first training samples and through division by the number of the first training samples. The determining of the smallest cosine similarity takes place simply by establishing the smallest value of the cosine similarities. The averaged cosine similarity or the smallest cosine similarity is established as threshold value 112*c*.

As a further parameter for establishing whether or not the sensor data comprise a scenario represented in the training data, a Mahalanobis distance can be determined between a covariance matrix, the averaged feature vector and the determined feature vector 132. Based on the Mahalanobis distance and the $\chi^2$-distribution, for each class a reference value can be determined, which is compared with the respective threshold value of the class. The covariance matrix for each class can be determined beforehand 113.

If the threshold values for all classes are not reached, the detected scenario can be labelled as unknown compared to the training data 150, a minimum confidence can be assigned to the scenario 151 and/or the corresponding sensor data can be stored as a supplement to the training data 152.

Figure 2:
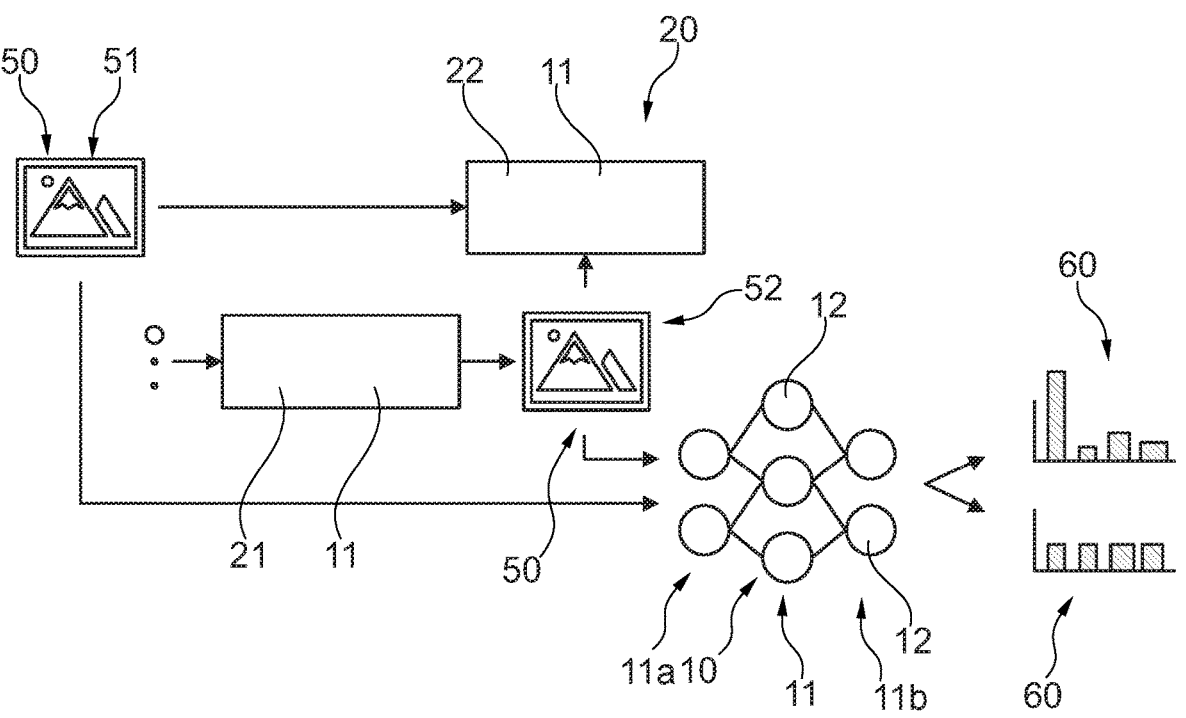
FIG. 2: a training of a classifier and of a GAN.

FIG. 2 shows the training of a classifier 10 and of a GAN 20, wherein the GAN 20 comprises a generator 21 and a discriminator 22. As input for the discriminator 22, first training samples 51 are provided, and second training samples 52 by the generator 21. The generator 21 generates second training samples 51 at the decision boundaries of the classifier 10 and thus attempts to deceive the discriminator 22 and to allow the classifier 10 to assign an evenly distributed probability to the second training samples 52.

Both the classifier 10 and also the generator 21 and the discriminator 22 concern neural networks 11. In the case of the classifier 10 by way of example neurons 12, which are arranged in layers, are illustrated. The neural network 11 of the classifier 10 can be divided functionally into two units, a first unit 11*a* and a second unit 11*b*. The first unit 11*a* is configured as a feature extractor, whereas the second unit 11*b* serves as a classification unit.

On the right adjacent to the classifier 10, determined uncertainties 60 of the softmax normalization 31 are represented divided in tabular form to the multiplicity of classes. In the upper part, the uncertainties 60 of the softmax normalization 31 is shown for a first training sample, wherein the first class is by far the highest, so that at least this class is assigned with a high confidence. As in the training no averaged feature vector is present yet, operations are carried with the uncertainties obtained after the softmax normalization.

It is different in the lower example, which shows a second training sample in which the uncertainties 60 of the softmax normalization 31 are evenly distributed for all classes.

Figure 3:
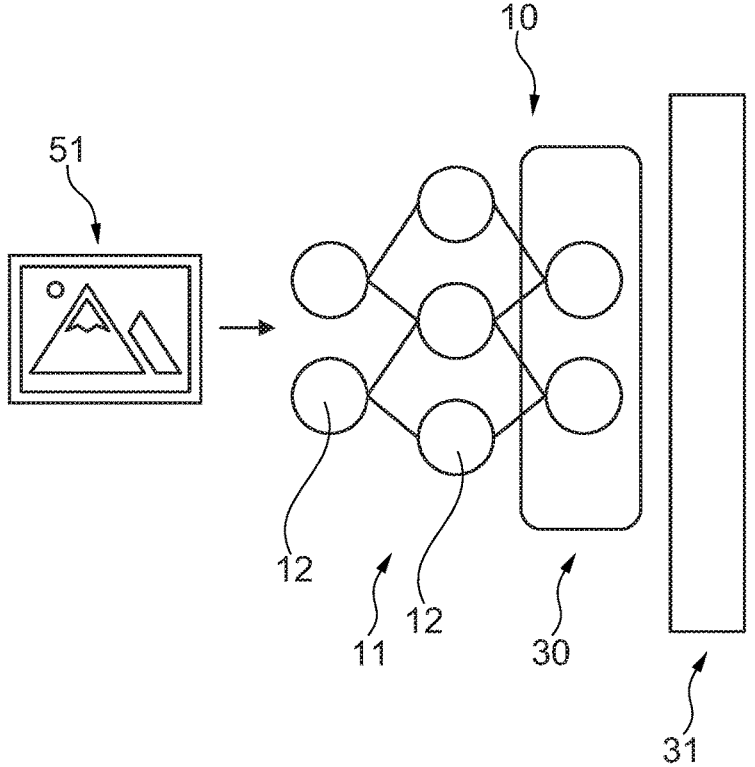
FIG. 3: a determining of an averaged feature vector.

FIG. 3 represents how, after the training, the classifier 10 an averaged vector 30 is determined, and namely before a softmax normalization 31. This takes place in the last layer of the second unit, therefore of the classifier, before the softmax normalization 31, and namely on the basis of all first training samples 51, accordingly for each class. In the case of application, then on the basis of sensor data and the averaged feature vectors 30 for the classes the cosine similarity is determined according to FIG. 1.

EXAMPLES OF THE NEURAL NETWORKS

The feature extractor can be constructed as follows:

Embodiment as MLP

Input: Batch size×2048×3
Layer 0:
    Layer 0.1: Multi Layer Perceptrons (MLP)
      Number of functions: 64
      Kernel 1×3

Batch normalization
      Activation function: ReLU
    Layer 0.2: MLPs
      Number of functions: 128
      Kernel 1×1
      Batch normalization
      Activation function: ReLU
    Layer 0.3: MLPs
      Number of functions: 1024
      Kernel 1×1
      Batch normalization
      Activation function: ReLU
    Layer 0.4: Fully Connected
      Output: 512
      Batch normalization
      Activation function: ReLU
    Layer 0.5: Fully Connected
      Output: 256
      Batch normalization
      Activation function: ReLU
    Layer 0.5: Fully Connected
      Output: 9
      No activation function
      Initializing of the variables with 0
    Layer 0.6: Addition with unit matrix [1 0 0 0 1 0 0 0 1]
    Output: Batch size×3×3
Layer 1: Input*Output Layer 0
Layer 2: MLPs
    Number of functions: 64
    Kernel 1×3
    Batch normalization
    Activation function: ReLU
Layer 3: MLPs
    Number of functions: 64
    Kernel 1×1
    Batch normalization
    Activation function: ReLU
Layer 4: Learning of matrix for multiplication
    Layer 4.1: MLP
      Number of functions: 64
      Kernel 1×1
      Batch normalization
      Activation function: ReLU
    Layer 4.2: MLPs
      Number of functions: 128
      Kernel 1×1
      Batch normalization
      Activation function: ReLU
    Layer 4.3: MLPs
      Number of functions: 1024
      Kernel 1×1
      Batch normalization
      Activation function: ReLU
    Layer 4.4: Fully Connected
      Output: 512
      Batch normalization
      Activation function: ReLU
    Layer 4.5: Fully Connected
      Output: 256
      Batch normalization
      Activation function: ReLU
    Layer 4.5: Fully Connected
      Output: 4096
      No activation function
      Initializing of the variables with 0

Layer 4.6: Addition with unit matrix (size 64)
   Output: Batch size×64×64
Layer 5: Layer 3*Output Layer 4
Layer 6: MLPs
   Number of functions: 64
   Kernel 1×1
   Batch normalization
   Activation function: ReLU
Layer 7: MLPs
   Number of functions: 128
   Kernel 1×1
   Batch normalization
   Activation function: ReLU
Layer 8: MLPs
   Number of functions: 512
   Kernel 1×1
   Batch normalization
   Activation function: ReLU
Layer 9: Classification unit
   Layer 9.1 Fully Connected Layer:
      Number of output neurons: 512
      Activation function: ReLU
   Layer 9.2: Dropout
      Dropout rate: 0.5
   Layer 9.3 Fully Connected Layer:
      Number of output neurons: 512
      Activation function: ReLU
   Layer 9.4: Dropout
      Dropout rate: 0.5
   Layer 9.5: Fully Connected Layer (=bottleneck vector):
      Number of output neurons: number of classes to be classified
GGF Softmax normalization layer Embodiment as CNN Input: Batch size×80×128×2 (2 channels for solid state: intensity and depth)
Layer 1: Convolution
   Kernel size: 3×3
   Number of output feature maps: 64
   Activation: ReLU
Layer 2: Convolution
   Kernel size: 3×3
   Number of output feature maps: 64
   Activation: ReLU
Layer 3: Max Pooling
   Kernel size: 2×2
Layer 4: Convolution
   Kernel size: 3×3
   Number of output feature maps: 128
   Activation: ReLU
Layer 5: Convolution
   Kernel size: 3×3
   Number of output feature maps: 128
   Activation: ReLU
Layer 6: Max Pooling
   Kernel size: 2×2
Layer 7: Convolution
   Kernel size: 3×3
   Number of output feature maps: 256
   Activation: ReLU
Layer 8: Convolution
   Kernel size: 3×3
   Number of output feature maps: 256
   Activation: ReLU.
Layer 9: Max Pooling
   Kernel size: 2×2

Layer 10: Convolution
   Kernel size: 3×3
   Number of output feature maps: 512
   Activation: ReLU
Layer 11: Convolution
   Kernel size: 3×3
   Number of output feature maps: 512
   Activation: ReLU
Layer 12: Max Pooling
   Kernel size: 2×2
Layer 13: Convolution
   Kernel size: 3×3
   Number of output feature maps: 512
   Activation: ReLU
Layer 14: Convolution
   Kernel size: 3×3
   Number of output feature maps: 512
   Activation: ReLU
Layer 15: Max Pooling
   Kernel size: 2×2
Layer 16: Flattening of the features (preparation, in other words adaption of the dimension, as input for classifier)
Layer 17: Classification unit
   Layer 17.1 Fully Connected Layer:
      Number of output neurons: 512
      Activation function: ReLU
   Layer 17.2: Dropout
      Dropout rate: 0.5
   Layer 17.3 Fully Connected Layer:
      Number of output neurons: 512
      Activation function: ReLU
   Layer 17.4: Dropout
      Dropout rate: 0.5
   Layer 17.5: Fully Connected Layer (=bottleneck vector):
      Number of output neurons: Number of classes to be classified
GGF Normalization with softmax normalization
The training of the classifier and of the GAN can be determined by the following parameters:
   Optimizer: Adam Optimizer (respectively own optimizer for discriminator, generator and classifier)
   Learning Rate: 0.0001
      Exponential decay: Staircase
      The learning rate decreases as a step function. After 200000 steps it decreases by half, until it has reached a minimum of 0.00001, after which it remains constant
   Batch size: 32
   Initialization of all variables (except initialization with 0): Xavier initialization
   Total epochs: 100

The invention claimed is:

1. A light detection and ranging (LiDAR) device, comprising:
   a classifier unit including a processor and a memory that stores executable instructions that, when executed by the classifier unit, facilitate performance of operations, the operations comprising:
   generating point cloud data representing an environment;
   detecting a cluster of reflections in the point cloud data;
   storing, in the memory, an averaged feature vector and a threshold value for each class of a multiplicity of predefined classes, wherein for each class, the averaged feature vector is determined by averaging feature vectors of first training samples of the class, and wherein the threshold value is determined by:

determining a cosine similarity between the feature vector of each first training sample of the class and the averaged feature vector of the class, determining an averaged cosine similarity or a smallest cosine similarity of the first training samples of the class, and establishing the averaged cosine similarity or the smallest cosine similarity as the threshold value of the class;

determining a feature vector from the cluster of reflections in the point cloud data;

determining a similarity measure between the feature vector from the cluster of reflections and the averaged feature vector for each of the multiplicity of predefined classes;

comparing the similarity measure with the threshold value for each of the multiplicity of predefined classes; and determining that the feature vector is not represented by any of the multiplicity of predefined classes when the similarity measure is not greater than any of the threshold values.

2. The LIDAR device according to claim 1, the operations further comprising determining a Mahalanobis distance between a covariance matrix and the averaged feature vector and the feature vector for each class of the multiplicity of predefined classes.

3. The LiDAR device according to claim 2, wherein a reference value for each class of the multiplicity of predefined classes is determined based on the Mahalanobis distance and a $\chi^2$-distribution, wherein the reference value is compared with a second threshold value established for each class of the multiplicity of predefined classes, the method further comprising determining that the feature vector is not represented by any of the multiplicity of predefined classes when the reference value is not greater than any of the second threshold values.

4. The LiDAR device according to claim 1, wherein the classifier includes a neural network.

5. The LIDAR device according to claim 4, wherein the operations further comprise storing of the cluster of reflections in the point cloud data as a supplement to the first training samples.

6. The LIDAR device according to claim 4 wherein the classifier is trained using second training samples, wherein the second training samples are produced by a generative adversarial network (GAN), and wherein the GAN comprises a generator and a discriminator.

7. The LiDAR device according to claim 6, wherein training of the classifier is carried out based on a cross entropy loss based on the first training samples added with a Kullback-Leibler divergence based on the second training samples.

8. The LIDAR device according to claim 6, wherein the operations further comprise a training of the GAN, namely of the generator and of the discriminator, wherein the training of the classifier and the training of the GAN take place jointly.

9. The LIDAR device according to claim 8, wherein the training of the generator is carried out based on a binary cross entropy loss based on the second training samples added with a Kullback-Leibler divergence based on the second training samples.

10. The LIDAR device according to claim 6, wherein the averaged feature vector of a class is determined by the following steps:

determining a feature vector for each first training sample of the class, adding the feature vectors of all first training samples of the class for obtaining an added feature vector dividing the added feature vector by the number of the first training samples of the class.

11. A light detection and ranging (LiDAR) device, comprising:

at least one solid state LiDAR sensor configured to generate a point cloud data representing an environment;

a pre-processing unit to detect a cluster of reflections in the point cloud data;

a memory storing an averaged feature vector and a threshold value for each class of a multiplicity of predefined classes, wherein, for each class, the averaged feature vector is determined by averaging feature vectors of first training samples of the class, and wherein the threshold value is determined by:

determining a cosine similarity between the feature vector of each first training sample of the class and the averaged feature vector of the class, determining an averaged cosine similarity or a smallest cosine similarity of the first training samples of the class, and establishing the averaged cosine similarity or the smallest cosine similarity as the threshold value of the class;

a classifier unit to determine a feature vector from the cluster of reflections in the point cloud data, to determine a similarity measure between the feature vector and the averaged feature vector for each of the multiplicity of predefined classes, to compare the similarity measure with the threshold value for each of the multiplicity of predefined classes, and to determine that the feature vector is not represented by any of the multiplicity of predefined classes when the similarity measure is not greater than any of the threshold values.

12. A non-transitory computer-readable storage medium on which a program is stored which enables a computer, after it has been loaded into a memory of the computer, to carry out a method of operating a light detection and ranging (LiDAR) device, the method comprising:

generating point cloud data representing an environment;

detecting a cluster of reflections in the point cloud data;

storing, in a memory, an averaged feature vector and a threshold value for each of a multiplicity of predefined classes, wherein, for each class, the averaged feature vector is determined by averaging feature vectors of first training samples of the class, and wherein the threshold value is determined by:

determining a cosine similarity between the feature vector of each first training sample of the class and the averaged feature vector of the class, determining an averaged cosine similarity or a smallest cosine similarity of the first training samples of the class, and establishing the averaged cosine similarity or the smallest cosine similarity as the threshold value of the class;

determining a feature vector from the cluster of reflections in the point cloud data;

determining a similarity measure between the feature vector and the averaged feature vector for each of the multiplicity of predefined classes;

comparing the similarity measure with the threshold value for each of the multiplicity of predefined classes; and determining that the feature vector is not represented by any of the multiplicity of predefined classes when the similarity measure is not greater than any of the threshold values.

13. The LiDAR device according to claim 11, wherein the similarity measure comprises a Mahalanobis distance between a covariance matrix and the averaged feature vector and the feature vector for each class.

14. The LiDAR device according to claim 11, wherein the classifier unit includes a neural network, and the cluster of reflections in the point cloud data are stored as training data to train the neural network.

15. The non-transitory computer-readable storage medium according to claim 12, wherein the similarity measure comprises a Mahalanobis distance between a covariance matrix and the averaged feature vector and the feature vector for each class.

16. The non-transitory computer-readable storage medium according to claim 12, wherein the determining the feature vector, the determining the similarity measure, the comparing, and the determining that the feature vector is not represented by any of the multiplicity of predefined classes are performed by a classifier that includes a neural network, and the cluster of reflections in the point cloud data are stored as training data to train the neural network.

* * * * *